United States Patent [19]
Woo

[11] 3,887,504
[45] June 3, 1975

[54] PROCESS OF MAKING A SULFUR CONTAINING FOAM AND PRODUCT OBTAINED THEREFROM

[75] Inventor: Gar Lok Woo, Tiburon, Calif.

[73] Assignee: Chevron Research Company, San Francisco, Calif.

[22] Filed: Jan. 31, 1974

[21] Appl. No.: 438,508

Related U.S. Application Data

[63] Continuation-in-part of Ser. No. 344,694, March 26, 1973, which is a continuation-in-part of Ser. No. 253,144, May 15, 1972, abandoned.

[52] U.S. Cl. .... 260/2.5 AM; 260/2.5 A; 260/2.5 N; 260/2.5 BE; 260/2.5 AK; 260/17.4 R; 260/42.18; 260/42.22; 260/42.24; 260/857 PE; 260/857 UN; 260/873; 260/874
[51] Int. Cl............................................ C08g 22/44
[58] Field of Search...... 260/2.5 R, 2.5 AM, 2.5 AJ, 260/2.5 BB

[56] References Cited
UNITED STATES PATENTS
3,222,301  12/1955  Dahm ............................ 260/2.5 BB
3,542,701  11/1970  Von Raamsdonk............ 260/2.5 AJ

*Primary Examiner*—Morton Foelak
*Attorney, Agent, or Firm*—G. F. Magdeburger; John Stoner, Jr.; T. G. DeJonghe

[57] ABSTRACT

Sulfur foam is produced by reacting molten sulfur with organic protonic acids to obtain an adduct and then reacting the adduct with a polyisocyanate to obtain a foam containing more than 50 weight percent sulfur. Before or after reacting the sulfur with the organic acid, or at the same time, the sulfur can be modified by reacting it with a sulfur-plasticizing material.

33 Claims, No Drawings

PROCESS OF MAKING A SULFUR CONTAINING FOAM AND PRODUCT OBTAINED THEREFROM

CROSS REFERENCE TO RELATED APPLICATIONS

This application is a continuation-in-part of Ser. No. 344,694, filed Mar. 26, 1973, which in turn is a continuation-in-part of application Ser. No. 253,144, filed May 15, 1972, now abandoned, both of which application disclosures are incorporated herein by reference.

BACKGROUND OF THE INVENTION

The present invention relates to sulfur foams.

A recent patent issued to Dale and Ludwig, U.S. Pat. No. 3,337,355, discloses the production of a sulfur foam using the following steps:

a. heating sulfur to above its melting point;

b. blending a stabilizing agent with the molten sulfur;

c. blending a viscosity increaser with the molten sulfur, steps (b) and (c) being taken in either order with respect to the other;

d. forming bubbles in the molten sulfur, and e. cooling the molten sulfur to below its melting point.

Stabilizing agents disclosed include talcs, mica and plate-like particles. Viscosity increasers disclosed include phosphorus sulfide, styrene monomers and polysulfide liquids. According to U.S. Pat. No. 3,337,355:

"The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substance having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N,N'-dinitrosoterephthalamide sold under the trade name Nitrosan, sodium bicarbonate dispersed in a neutral oil sold under the trade name Unicel S, and N,N'-dinitrosopentamethylenetetramine sold under the trade name Unicel ND. Nitrosan, Unicel S, and Unicel ND are products of E. I. du Pont de Nemours & Co."

According to the examples in U.S. Pat. No. 3,337,355, typical ingredients for the sulfur foam include sulfur, talc, $P_2S_5$, calcium carbonate and phosphoric acid.

By retrospect in view of the present invention, art in the area of polyurethane foams can also be referred to by way of background. As indicated in Kirk-Othmer Encyclopedia of Chemical Technology (1965), Vol. 9, p. 853, the chemical ingredients of a urethane foam are a polyfunctional isocyanate (1) and a hydroxyl-containing polymer (2), along with catalysts to control the rate and type of reaction and other additives to control the surface chemistry of the process. A number of competing reactions can occur when (1) and (2) are brought together, but the main product, shown in the equation below, is a urethane (3).

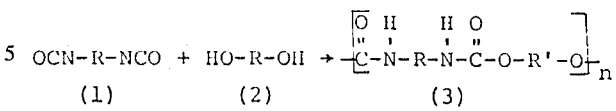

Originally, carbon dioxide was generated in situ (by the reaction of isocyanate with water) as a blowing agent for both rigid and flexible polyurethane foams. U.S. Pat. No. 2,814,600 discloses production of polyurethane foams by reaction of isocyanate groups with water to release carbon dioxide. It is said to still be the common practice today to rely largely on reaction of water with isocyanate as method of gas generation for flexible materials. Rigid cellular polyurethanes are now typically produced using volatile liquids, usually fluorocarbons, which act as expanding agents, producing gas as the foaming mixture is heated by the exotherm of the reaction.

Although it is not the typical method used to make polyurethane foams, it has been disclosed to react carboxylic acid groups with isocyanate groups to form amide bonds and release carbon dioxide. See, e.g., Saunders and Frisch, Part I, Interscience Publishers (1962) at p. 79.

U.S. Pat. No. 3,222,301 discloses polyurethane foams containing a small amount of dissolved sulfur to prevent discoloration of the polyurethane foam. As can be seen from the examples of U.S. Pat. No. 3,222,301, only a very small amount of sulfur is included in the final foam; one of the reactants for formation of the foam can pick up the necessary small amount of sulfur by filtering the reactant through finely divided sulfur prior to using the reactant to form the foam.

U.S. Pat. No. 3,542,701 discloses the use of sulfur in various foams, including polystyrene foams as well as polyurethane foams, to decrease the inflammability of the foam. According to U.S. Pat. No. 3,542,701, "The total amount of elementary sulfur in the foam or other cellular structure may be as high as slightly under 50% by weight." The process of U.S. Pat. No. 3,542,701 is stated to be: "... applicable to all foams or other cellular or porous structures of combustible synthetic macromolecular substances, without exceptions, although the best results are obtained with substances, which at the temperatures applied in the preparation of the foams or other cellular or porous structures of these substances hardly react with sulfur if at all."

SUMMARY OF THE INVENTION

According to the present invention, a process is provided for producing a sulfur foam containing at least 50 weight percent sulfur, which process comprises contacting and reacting molten sulfur with an organic protonic acid which is reactive with molten sulfur so as to incorporate the organic acid with sulfur to form a sulfur-organic acid adduct containing protonic acid groups, and then contacting and reacting the adduct with a polyisocyanate to obtain a sulfur foam.

Organic protonic acids which can be used are those compounds capable of ionizing to produce a proton and a negatively charged anion in which the group having the negative charge has at least two oxygen atoms, such as carboxylic acids, sulfonic acids, phosphonic acids, acidic esters of polybasic inorganic acids, and the like. Carboxylic acids are preferred protonic organic acids for use in the present invention. The carboxylic acids used are limited to those reactive with molten sulfur to form a sulfur-organic acid adduct containing COOH groups (the COOH group being the protonic acid group). Preferred carboxylic acids for use herein have from two to 30 carbon atoms, more preferably two to 15 carbon atoms.

I have found that particularly preferred organic acids which can perform as functionally indicated above in the first paragraph under "Summary of the Invention" are unsaturated acids such as acrylic acid and acids containing a disulfide bond or a mercapto group, such as dithiodipropionic acid or 3-mercaptopropionic acid.

The term "foam" is used herein to means a cellular material containing a gas in the cells. When initially formed, the foam may be finely divided gas bubbles in liquid, but after cooling the foam becomes a flexible or rigid solid containing gas bubbles.

Among other factors, the present invention is based on my surprising finding that sulfur foams containing large amounts of sulfur, in particular more than 50 weight percent sulfur, can be successfully prepared by the relatively short sequence of steps involving reacting sulfur with an organic acid to obtain an adduct, which is then reacted with a polyisocyanate to obtain a sulfur foam. Other steps can, of course, be added to this sequence. The foams contemplated by the present invention thus contain large amounts of sulfur. The reactions of the present invention are preferably carried out under substantially anhydrous conditions, for example, less than 0.2 weight percent water, based on the sulfur. The organic acids used in the present invention are restricted to those which are reactive with molten sulfur, i.e., reactive with sulfur at a temperature above about 240°F., preferably a temperature between about 240°–450°F., to yield a sulfur-organic acid adduct. More preferably, the temperature range is 280°–320°F.

The term "adduct" is used herein to connote formation of one or more chemical bonds between the sulfur and the organic acid.

In the present invention, a wide variety of acids can be used, as the present invention is based on a combination of steps wherein the substances used for the steps must perform certain functions, as are distinctly specified herein. The acids must retain the acid moiety after reaction with sulfur.

The organic acids which are disclosed in the aforesaid Ser. No. 253,144 and Ser. No. 344,694 can in general be used in the present invention.

Exemplary acids include sulfur-containing acids such as dithiodipropionic acid, dithioglycolic acid, mercaptoacetic acid, 3-mercaptopropionic acid, 1,2-dithiane-3,6-dicarboxylic acid, 1,2-dithiolane-4-carboxylic acid, 6,8-thioetic acid, p-mercaptobenzoic acid, mercaptophenylacetic acid, etc.; unsaturated monocarboxylic acids such as acrylic acid, oleic acid, methacrylic acid, monoesters of maleic or fumaric acid (methyl fumarate), monoallyl esters of dibasic acids (allyl succinate, allyl adipate), etc.; unsaturated polycarboxylic acids having at least 5 carbon atoms such as 2-pentene-1,5-dicarboxylic acid, 4-octene-1,8-dicarboxylic acid, 3-hexene-1,6-dicarboxylic acid, acid-esters formed by the reaction of an unsaturated dibasic or polybasic acid and a polyhydric alcohol or monoesters of a saturated polybasic acid and an unsaturated polyhydric alcohol (trimethylolpropanetrimaleate), etc.; and saturated acids which in the presence of molten sulfur are converted to sulfurized acids, such as palmitic acid, stearic acid, hexane carboxylic acid, various naphthenic acids, etc.

Among the useful sulfonic acids are hexane sulfonic acid, dodecylbenzene sulfonic acid, $\beta$-hydroxyoctane sulfonic acid, 3-hexene sulfonic acid, etc. Among other useful acids are octadecylbenzeneboronic acid, vinylbenzene boronic acid, 3-pentenylphosphinic acid, dihexylphosphinic acid, dicrotyl hydrogen phosphate, the cyclic diesters of boric acid, saturated and unsaturated cis-1,2- and 1,3-diols, etc.

The organic carboxylic acids are particularly preferred, especially monoolefinic carboxylic acids having from three to 30, preferably from three to 15, carbon atoms. In this connection it can be noted that some saturated acids will be satisfactory for use in the present invention. For example, if a saturated acid such as hexadecanoic acid is heated with sulfur, hydrogen sulfide is evolved and the hexadecanoic acid is dehydrogenated to form an unsaturated acid, which is then further transformed into a sulfurized acid. Unsaturated acids are preferred reactive acids for forming the sulfur-acid adduct. The unsaturated acids are believed to react with the molten sulfur principally at the double (or triple) carbon-carbon bond. Dithio organic acids are believed to react with the molten sulfur at the sulfur-sulfur bond of the dithio acid. In any case, in accordance with the present invention, the organic acid must react with the sulfur to form a sulfur-organic acid adduct containing protonic acid groups.

Preferably, the unsaturated, dithio or mercapto acids used in the process of the present invention have from two to 30 carbon atoms. Particularly preferred organic acids for use in the process of the present invention include acrylic acid, dithiodipropionic acid, 3-mercaptopropionic acid, 2-mercaptobenzoic acid, methacrylic acid and 2-mercaptoacetic acid.

The quantity of acid to be incorporated varies from 0.001 to 1.0, preferably 0.005 to 0.15 g-mol acid equivalents per 100 grams of sulfur. When the foaming agent is $CO_2$ resulting from an acid/isocyanate reaction, the higher levels of acid concentration give foams of low bulk density; whereas the lower levels result in foams of high bulk density.

Acrylic acid is an especially preferred acid for use in the process of the present invention. Preferred amounts of acrylic acid are from 0.2 to 15 weight percent, based on the molten sulfur. In general, preferred amounts of acrylic acid for use in the present invention are from 0.2 to 15, more preferably from 1 to 7, in weight percent, calculated as weight percent of the sulfur. It should be recognized that higher quantities of acid may be reacted with sulfur to form the adduct, and then this adduct can be diluted with sulfur to give a final acid concentration within the above ranges.

The polyisocyanates used herein are cross-linking agents which react with the acid groups of the sulfur-acid adduct to liberate $CO_2$ and at the same time effect cross-linking. Suitable polyisocyanates include both aliphatic and aromatic isocyanates, as are defined in the above-referenced patent applications Ser. Nos. 253,144 and 344,694. The polyisocyanates must be liquid at the foaming temperature.

Preferred polyisocyanates for use in the present invention are di- and triisocyanates. Particularly preferred are the less-volatile mixed isocyanates sold under the trade names of PAPI and MONDUR MR. The isocyanate groups of the polyisocyanate used in the process of the present invention will be part of an organic compound; the important feature of the organic polyisocyanate compound is that it contain at least two isocyanate groups capable of reacting with a protonic acid group to form an amide bond and release carbon dioxide. Many such polyisocyanate compounds are known by those skilled in the art.

The organic polyisocyanates which may be employed include aromatic and aliphatic as well as heterocyclic materials. Examples of suitable aromatic materials include tolylene 2,4-diisocyanate, 4,4'-diphenylmethane diisocyanate, tolylene 2,6-diisocyanate, polymethylene polyphenyl isocyanate (polymeric material made by Upjohn), bitolylene diisocyanate, dianisidene diisocyanate, triphenylmethane diisocyanate, and 3,3'-dichloro-4,4'-diphenylene diisocyanate. The aliphatic and cycloaliphatic materials which may be employed include such materials as hexamethylene diisocyanate, ethylidene diisocyanate, propylene-1,2-diisocyanate, cyclohexylene-1,2-diisocyanate, etc. The isothiocyanate analogs of these materials may be employed, examples of which include ethylidene diisothiocyanate, butylene-1,2-diisothiocyanate, and paraphenylene diisothiocyanate.

Another type of polyisocyanate useful in the process of this invention is the so-called prepolymer adducts of a polyhydroxy, polythiol or polyamino compound and excess polyisocyanate, for example, the product from the reaction of one mol of ethylene glycol and two mols of toluene diisocyanate. In general, the pre-polymers have the formula

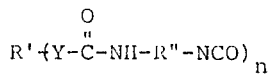

$$R'\{Y-\overset{O}{\underset{\|}{C}}-NH-R''-NCO\}_n$$

wherein R' is the nucleus of a polyhydric compound having n hydroxy groups, R'' is a diradical, Y is O, S, or NR''', R''' is H or low-molecular-weight alkyl group or an aryl group, and n has a value of 2 to 6. Typical compounds include the reaction product of toluene diisocyanate with diethylene glycol, of p,p'-diphenylmethane diisocyanate with trimethylolpropane, of m-xylylene diisocyanate with decane-1,10-diol, and of toluene diisocyanate with the adduct of trimethylol propane and propylene oxide and/or ethylene oxide, toluene diisocyanate with polytetramethylene glycol, etc. The preferred polyisocyanates are aromatic diisocyanates having boiling points higher than 130°C.

Particularly preferred polyisocyanates are hexamethylene diisocyanate, dianisidene diisocyanate, tolylene 2,4-diisocyanate, 4,4'-diphenylmethane diisocyanate, polymethylene polyphenyl isocyanate, 4,4'-diphenylene diisocyanate.

Polyisothiocyanates are also suitable for use in making sulfur foams by the process of the present invention. When using isothiocyanates, the blowing or foaming agent formed by reaction with the acid contains COS. Satisfactory polyisothiocyanates are any of the above polyisocyanates having an isothiocyanate group in place of the isocyanate group.

In an optical method of carrying out the process of the present invention, the sulfur may be plasticized by the addition of about 1 to 99, preferably 1 to 50, parts of a plasticizer per 100 parts of sulfur. Preferably after plasticization is complete, the organic acid is added to form the sulfur-acid adduct using the plasticized sulfur, and the process is continued as before. In another embodiment, the plasticizer can be added to the sulfur-acid mixture. The acid and plasticizer can also be added to the sulfur simultaneously. Plasticizers are useful to reduce cracking, especially surface cracking as occurs with some unplasticized sulfur foam. The acid ingredient itself is sometimes a sufficient plasticizer, but at other times extra, nonacidic plasticizers are needed or at least are advantageous in producing a good sulfur foam. Plasticizers are well known in the sulfur art (see Alberta Sulfur Research, Ltd., Quarterly Bulletin, Vol. VIII, No. 4, January–March 1972), and frequently include compounds having one or more sulfur atoms in the molecule.

Plasticized sulfur usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130°C. and is then covered with a square microscope slide cover slip. The slide is transferred to a hotplate and is kept at a temperature of 78° ± 2°C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten, elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in Ser. No. 344,694) required 2.9 minutes. Sulfur containing 6.3% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materials, such as styrene, α-methylstyrene, dicyclopentadiene, vinyl cyclohexene, the aromatic compound-sulfur adducts of Ser. No. 344,694 as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compounds are styrene and the phenol-sulfur adduct of Ser. No. 344,694. The preferred aliphatic compound is dicyclopentadiene.

The quantity of plasticizer to be added varies with the nature of the plasticizer, but usually is in the range 0.5 to 40 weight percent based on the final composition. Styrene, for example, is preferably used at the 1- to 10-weight-percent level, whereas polyunsaturated olefins such as dicyclopentadiene are preferably used at the 1- to 5-weight-percent level. The upper limit on plasticizer concentration is determined by the viscosity of the resulting plasticized sulfur. Final viscosity must be such that the composition will flow at the desired temperature and will also be able to be mixed with liquid polyisocyanate.

Thus, in accordance with a preferred embodiment of the present invention, a process is provided for producing a sulfur foam containing at least 50 weight percent sulfur, which comprises contacting and reacting molten sulfur with a plasticizing material which is reactive with molten sulfur to incorporate the plasticizer with sulfur to thereby obtain a modified liquid-phase sulfur compound which is more plastic at a given temperature than is elemental sulfur; contacting and reacting the modified liquid-phase sulfur compound with an organic protonic acid which is reactive with the sulfur of said compound so as to incorporate the organic acid with said compound and form a modified sulfur-organic acid adduct containing protonic acid groups, and then contacting and reacting the adduct with a polyisocyanate to obtain a sulfur foam. The steps prior to reacting with the isocyanate preferably are in the order given but in general they can be in any order or simultaneous.

Another optional ingredient is a solid stabilizer, which is defined as finely divided, inert material having individual particles which are plate-like in form. Examples include talc, mica, carbon black, aluminum pigment, kaolin, etc. This ingredient is usually added to the molten-sulfur mixture just before the cross-linking agent(s) is added. When used, the quantity of stabilizer varies from 1 to 15 parts per 100 parts of sulfur. Preferably the stabilizer is added prior to the addition of the isocyanate.

In addition to, or in place of, the previously described additives, in certain applications it is desirable to add to the foam compositions other nonplate-like materials, typically those which have been employed as fillers in plastic foams. Materials of this type are described in "Plastic Foams," Vol. I, Calvin James Banning, Wiley-Interscience, 1969. Examples of such fillers include wood-derived materials such as wood flour, resins, and synthetic fibers such as nylon acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc. Such fillers are employed at concentrations in the range of about 1 to 15 parts per 100 parts of sulfur, depending on the viscosity or thixotropic property of the final material. The above stabilizers and additives are particularly useful and important for getting good cell-structure foam when the amount of cross-linking is low.

It is also within the scope of the present invention to use the additives, catalysts, surfactants, retarders, and other modifiers recognized in the isocyanate art.

The product made by the process of the present invention is a solid sulfur foam comprising multiple polysulfide chains interconnected by carbon-containing groups.

The present invention is directed to the sulfur foam products produced by any of the processes of the present invention. The sulfur foam products of the process as described above are advantageously used in applications such as insulation and as building materials, including as a subbase in road-paving construction.

The sulfur foam products of the present invention are produced using steps as described above wherein reactions are carried out at temperatures such that the sulfur or plasticized sulfur is in the liquid state. In general, temperatures in the range 110° to 180°C. are satisfactory; however, the preferred range is 115°–140°C. The final sulfur foam product is typically obtained by cooling to below molten-sulfur temperature, usually approximately ambient temperature.

EXAMPLES

EXAMPLE 1 — SULFUR AND ACRYLIC ACID

A flask, equipped with a stirrer, condenser and a heating means, was charged with 1,000 g of sulfur, which was heated to 150°C. After the sulfur was all melted, 87.2 g of acrylic acid was introduced through a syringe into the bottom of molten sulfur. Heating at 130°–150°C. was continued for 3 hours. During this time there was a noticeable increase in viscosity. The mass was cooled to ambient temperature and stored in a covered container.

A 200-g portion of the above sulfur-acrylic acid adduct was heated to melting (120°C.) Then 1.3 g of DC-193 surfactant (trademark for a silicon surfactant made by Dow-Corning) was added and mixed well. Finally, at a temperature of 118°C., 19.7 g of Mobay's MONDOR MR (a mixture of di- and triisocyanates, mainly diphenylmethanediisocyanate and polymethylenepolyphenylisocyanate was added, and the well-stirred mixture was poured into a paper cup, where it produced a 21-pound-per-cubic-foot foam.

EXAMPLE 2 — SULFUR, ACRYLIC ACID AND TALC

A 2-liter, round-bottom flask equipped with a heater, stirrer, thermometer, condenser and dropping funnel was charged with 1,240 g of sulfur, which was then heated to 150°C. To this was added 414 g of acrylic acid over 30 minutes time. The resulting mixture was stirred at 145°–158°C. for 4 hours. It was then cooled to give a solid adduct having 25% of incorporated acrylic acid.

A portion of the above adduct (15 g) was melted with an additional 85 g of sulfur. The resulting blend was stirred at 140°C. for 2 hours. Then 9 g of talc was added while stirring continued. The temperature was lowered to 125°C. and 0.5 g of DC-193 surfactant was added. Finally, 6.5 g of MONDUR MR polyisocyanate was added. The mixture was well mixed and then poured into a cup to give about 500 ml of foam.

EXAMPLE 3 — SULFUR, ACRYLIC ACID, TALC AND STYRENE

To 4,000 g of stirred, molten sulfur at 145°C. there was added a mixture of 56 g of acrylic acid and 200 g of styrene. This addition required about one-half hour. After all was added, stirring at 145°–150°C. was continued for three-fourths hour.

To 3,000 g of the above molten mixture, at 140°C., there was added 6.9 g of DC-193 surfactant 193) and 45 g of talc. This mixture was stirred until the temperature reached 125°C., at which time 98 g of MONDUR MR polyisocyanate was added. The reaction mixture was stirred and then poured into a 13 inch × 13 inch × 6 inch mold, where it foamed in place. The product was a 22-pound-per-cubic-foot foam.

Another portion of the original sulfur-acrylic acid-styrene adduct (1200 g) was treated in the same way with an additional 1200 g of sulfur, 5.9 g of surfactant, 120 g of talc and 39.6 g of diisocyanate. These proportions gave a final foam having a density of 30 pounds per cubic foot.

EXAMPLE 4 — SULFUR, ACRYLIC ACID AND STYRENE

A 1-liter, round-bottom flask equipped with a stirrer, thermometer and condenser was charged with 1,000 g of sulfur at a temperature of 152°C. Acrylic acid (70 g) was fed into the bottom of the flask through a syringe. Temperature was maintained at 145°–150°C. After about 15 minutes, the reaction mix began to increase in viscosity. Stirring at this temperature was continued for 2½ hours.

A portion of the above molten mixture (470 g) was mixed with 50 g of styrene and stirred at 150°C. for one-half hour. To a 100-g portion of this mixture was added 2.0 g of surfactant and 19.5 g of a polyisocyanate prepolymer (prepared from 479 g of MONDUR MR polyisocyanate, 255 g of a polymeric triol [Plurocal TP-2540] and 15 g of methyldiethanolamine). After stirring, the mixture foamed in place to give a 9.1-pound-per-cubic-foot foam having a compressive strength of 25 psi at 10% deformation.

EXAMPLE 5 — SULFUR, ACRYLIC ACID AND DICYCLOPENTADIENE

A mixture of 1,000 g of sulfur and 105 g of dicyclopentadiene was stirred at 135°–155°C. for 45 minutes. Then 45 g of acrylic acid was added and the resulting mixture was stirred at 140°–145°C. for 45 minutes.

To 100 g of the above molten adduct was added 0.5 g of surfactant and 7.4 g. of MONDUR MR polyisocyanate. After stirring, the mixture was placed in a 140°C. oven for 10 minutes. About 300 ml of foam formed.

To another 100-g portion of the molten sulfur-dicyclopentadiene-acrylic acid adduct was added 0.4 g of surfactant and 11.3 g of prepolymer (the same as used in Example 4). After 10 minutes in a 140°C. oven, a foam having about 600 ml of volume was obtained.

To a 300-g portion of the original molten adduct, there was added 100 g of molten sulfur. The resulting mixture was stirred at 130°C. for one-half hour. Then 2.3 g of surfactant and 31.0 g of prepolymer (as in Example 4) were added. After stirring, the mixture was poured into a 9 inch × 8 inch × 4 inch mold, where it formed a foam about 2 inches deep.

EXAMPLE 6 — SULFUR, ACRYLIC ACID AND DIPENTENE DIMERCAPTAN

To 1,875 g of molten sulfur at 150°C. was added 150 g of dipentene dimercaptan over a period of 40 minutes. The resulting mixture was stirred at 150°C. for 10 minutes. Then 18.4 g of acrylic acid was added and stirring was continued for 1½ hours.

To 200 g of this adduct at 125°C. were added 1 g of DC-193 surfactant and 7 g of MONDUR MR polyisocyanate. The resulting foam had a volume of 400 ml.

To 1,800 g of the molten adduct at 145°C. was added 90 g of talc and 5.2 g of surfactant. After brief stirring, 40 g of MONDUR MR polyisocyanate was added and the mixture was poured into a 12 inch × 12 inch × 6 inch mold. The final foam had a depth of about 1½ inches.

EXAMPLE 7 — SULFUR, ACRYLIC ACID AND POLYPHENYLENE SULFIDE

A mixture of 992 g of sulfur and 110 g of polyphenylene sulfide (Phillips Petroleum: Ryton P-3) was stirred for 2½ hours as the temperature was raised from 160°C. to 300°C.

To the above adduct at 150°C. was added 42.8 g of acrylic acid. The resulting mixture was stirred at 150°C. for 1 hour.

To 130 g of the molten sulfur-polyphenylene sulfide-acrylic acid adduct was added 1.7 g of surfactant and 9.6 g of MONDUR MR polyisocyanate. After rapid stirring, the reaction mixture was put in a 140°C. oven for 5 minutes. A foam 700 ml in volume was obtained.

EXAMPLE 8 — SULFUR, DITHIODIPROPIONIC ACID AND POLYPHENYLENE SULFIDE

An adduct of sulfur and polyphenylene sulfide was prepared by heating a mixture containing 140 g and 30 g of the two components, respectively, at 235°–245°C. for 4 hours. Then the adduct was cooled to 165°C. and 7.5 g. of dithiodipropionic acid was added. Stirring was continued for an additional hour at 160°–165°C. The adduct was then cooled to 140°C. and 1.5 g of surfactant and 11.2 g of MONDUR MR polyisocyanate were added. Foaming began immediately. The product foam was somewhat flexible and was dark green in color.

EXAMPLE 9 — SULFUR, ACRYLIC ACID AND POLYPHENYLENE SULFIDE

A sulfur-acrylic acid-polyphenylene sulfide adduct prepared as in Example 7 (100 g) was mixed with 1.2 g of surfactant at 140°C. Then 17.5 g of an equal-weight mixture of MONDUR MR polyisocyanate and Adiprene L-100 (a preparation of toluene diisocyanate and a diol sold by Du Pont) was added. After stirring, the mixture was put in a 140°C. oven for 5 minutes. A flexible foam having a volume of 800 ml was obtained.

EXAMPLE 10 — SULFUR, ACRYLIC ACID, POLYPHENYLENE SULFIDE AND POLYETHYLENE

A sulfur-acrylic acid-polyphenylene sulfide adduct, prepared as in Example 7 (130 g), was mixed with 1.4 g of a surfactant at 140°C. Then 8.5 g of polyethylene powder was added, followed immediately by 12.5 g of MONDUR MR polyisocyanate. After stirring, the mixture was put in a 140°C. oven for 6 minutes, and in an 80°C. oven for 20 minutes. The resulting flexible foam occupied 700 ml.

EXAMPLE 11 — SULFUR, DITHIODIPROPIONIC ACID AND PHENOL/SULFUR ADDUCT

A phenol/sulfur adduct was prepared from the reaction of 2,915 g of sulfur and 1,350 g of phenol in the presence of 205 g of 13% aqueous caustic (see Ser. No. 344,694).

Sulfur (200 g) and 128 g of the above phenol/sulfur adduct were heated to 140°C., and then 28 g of dithiodipropionic acid was added. The mixture was stirred for 3 hours at 140°C.

To 43 g of the above mixture at 110°C. was added 0.6 g of surfactant. After stirring briefly, 6.5 g of toluene diisocyanate was added to the mixture. This material, after being well stirred, expanded to form a rigid cellular structure. The resulting foam had a density of 3.5 pounds per cubic foot.

EXAMPLE 12 — SULFUR, α-OLEFIN SULFONIC ACIDS AND PHENOL/SULFUR ADDUCT

A mixture of 344 g of sulfur and 172 g of a phenol/sulfur adduct (see Example 11) was heated to 170°C. Then 110 g of mixed sulfonic acids (prepared by the reaction of mixed α-olefins having from 15 to 18 carbon atoms with about an equal molar amount of $SO_3$ — the product contains alkene sulfonic acids and hydroxyalkane sulfonic acids, as well as about 40% neutral sultones) were added. The resulting mixture was heated for 1 hour at 140°–150°C.

To 200 g of this mixture at 130°C. was added 0.8 g of a surfactant and 15 g of MONDUR MR polyisocyanate. After rapid stirring, the mixture produced a foam having a volume of 500 ml.

What is claimed is:

1. A process for producing sulfur foam containing at least 50 weight percent sulfur, which comprises contacting and reacting molten sulfur with .001 to 1.0 g. mole acid equivalents of an organic protonic acid per 100 grams of sulfur wherein the organic protonic acid is reactive with molten sulfur so as to incorporate the organic acid with sulfur to form a sulfur-organic acid adduct containing protonic acid groups, and then contacting and reacting the protonic acid groups of the adduct with an organic polyisocyanate to obtain sulfur foam and wherein said contacting and reacting are carried out in the liquid phase.

2. A process in accordance with claim 1 wherein the organic acid is a carboxylic acid.

3. A process in accordance with claim 2 wherein the organic acid is an unsaturated acid, a dithio acid, or a mercapto acid.

4. A process in accordance with claim 2 wherein the organic acid is an unsaturated aliphatic carboxylic acid containing from three to 30 carbon atoms.

5. A process in accordance with claim 2 wherein the organic acid is acrylic acid.

6. A process in accordance with claim 2 wherein the polyisocyanate is an aryl isocyanate containing two or three isocyanate groups.

7. A process for producing a sulfur foam containing at least 50 weight percent sulfur, which comprises contacting and reacting molten sulfur with an organic plasticizer which is reactive with molten sulfur so as to incorporate the plasticizer with sulfur to thereby obtain a modified sulfur compound which is more plastic at a given temperature than is elemental sulfur; contacting and reacting the modified sulfur compound with .005 to .15 g. mole acid equivalents of an organic protonic acid per 100 grams of sulfur wherein the organic protonic acid is reactive with the sulfur of said compound so as to incorporate the organic acid with said compound and form a modified sulfur-organic acid adduct containing protonic acid groups; and then contacting and reacting the protonic acid groups of the adduct with an organic polyisocyanate to obtain a sulfur foam and wherein said contacting and reacting are carried out in the liquid phase.

8. A process in accordance with claim 7 wherein the organic acid is a carboxylic acid.

9. A process in accordance with claim 7 wherein the organic acid is an unsaturated acid, a dithio acid or a mercapto acid.

10. A process in accordance with claim 7 wherein the organic acid is an unsaturated aliphatic carboxylic acid containing from three to 30 carbon atoms.

11. A process in accordance with claim 7 wherein the organic acid is acrylic acid.

12. A process in accordance with claim 8 wherein the plasticizer is styrene.

13. A process in accordance with claim 8 wherein the plasticizer is dicyclopentadiene.

14. A product produced by the process of claim 1.

15. A product produced by the process of claim 4.

16. A product produced by the process of claim 8.

17. A product produced by the process of claim 1.

18. A process for producing a sulfur foam containing at least 50 weight percent sulfur, which comprises contacting and reacting molten sulfur with a plasticizer and .005 to .15 g. mole acid equivalents of an organic protonic acid per 100 grams of sulfur wherein the plasticizer and organic protonic acid are reactive with sulfur, to thereby obtain a modified sulfur-organic acid adduct containing protonic acid groups; and then contacting and reacting the protonic acid groups of the adduct with an organic polyisocyanate to obtain a sulfur foam and wherein said contacting and reacting are carried out in the liquid phase.

19. A process in accordance with claim 18 wherein the organic acid is a carboxylic acid.

20. A process in accordance with claim 18 wherein the organic acid is an unsaturated acid, a dithio acid or a mercapto acid.

21. A process in accordance with claim 18 wherein the organic acid is an unsaturated aliphatic carboxylic acid containing from 3 to 30 carbon atoms.

22. A process in accordance with claim 18 wherein the organic acid is acrylic acid.

23. A process in accordance with claim 19 wherein the plasticizer is styrene.

24. A process in accordance with claim 19 wherein the plasticizer is dicyclopentadiene.

25. A process for producing a sulfur foam containing at least 50 weight percent sulfur, which comprises contacting and reacting molten sulfur with .005 to .15 g. mole acid equivalents of an organic protonic acid per 100 grams of sulfur wherein the organic protonic acid is reactive with the sulfur so as to form a sulfur-organic acid compound and reacting the sulfur-organic acid compound with a plasticizer which is reactive with molten sulfur so as to incorporate the plasticizer with the sulfur-organic acid compound to thereby obtain a modified sulfur-organic acid adduct containing protonic acid groups, and then contacting and reacting the protonic acid groups of the adduct with an organic polyisocyanate to obtain a sulfur foam and wherein said contacting and reacting are carried out in the liquid phase.

26. A process in accordance with claim 25 wherein the organic acid is a carboxylic acid.

27. A process in accordance with claim 25 wherein the organic acid is an unsaturated acid, a dithio acid or a mercapto acid.

28. A process in accordance with claim 25 wherein the organic acid is an unsaturated aliphatic carboxylic acid containing from three to 30 carbon atoms.

29. A process in accordance with claim 25 wherein the organic acid is acrylic acid.

30. A process in accordance with claim 26 wherein the plasticizer is an aromatic compound.

31. A process in accordance with claim 30 wherein the plasticizer is styrene.

32. A process in accordance with claim 25 wherein the plasticizer is dicyclopentadiene.

33. A process in accordance with claim 1 wherein .005 to .15 g. mole acid equivalents are used per 100 grams of sulfur.

* * * * *

UNITED STATES PATENT AND TRADEMARK OFFICE
CERTIFICATE OF CORRECTION

PATENT NO. : 3,887,504
DATED : June 3, 1975
INVENTOR(S) : Gar Lok Woo

It is certified that error appears in the above-identified patent and that said Letters Patent are hereby corrected as shown below:

Col. 3, line 15, "means" should read --mean--.

Col. 3, line 29, before "The" begin a new paragraph.

Col. 5, line 64, "optical" should read --optional--.

Col. 6, line 43, "6.3%" should read --6.6%--.

Col. 12, line 13 (Claim 17), "1" should read --12--.

Signed and Sealed this fourth Day of November 1975

[SEAL]

Attest:

RUTH C. MASON
*Attesting Officer*

C. MARSHALL DANN
*Commissioner of Patents and Trademarks*